(12) United States Patent
Mariyani et al.

(10) Patent No.: US 11,451,954 B1
(45) Date of Patent: Sep. 20, 2022

(54) WIRELESS COMMUNICATION SERVICE DELIVERY USING MULTIPLE DATA NETWORK NAMES (DNNS)

(71) Applicant: T-Mobile Innovations LLC, Overland Park, KS (US)

(72) Inventors: Anil Kumar Mariyani, Ashburn, VA (US); Rajil Malhotra, Olathe, KS (US); Gerald Baylis Prince Young, Olathe, KS (US); Anuj Sharma, Broadlands, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 26 days.

(21) Appl. No.: 17/166,858

(22) Filed: Feb. 3, 2021

(51) Int. Cl.
| | |
|---|---|
| *H04W 4/00* | (2018.01) |
| *G06F 15/16* | (2006.01) |
| *H04L 12/28* | (2006.01) |
| *H04W 8/26* | (2009.01) |
| *H04L 61/30* | (2022.01) |

(52) U.S. Cl.
CPC ............... *H04W 8/26* (2013.01); *H04L 61/30* (2013.01)

(58) Field of Classification Search
CPC .................................. H04W 8/26; H04L 61/30
USPC ......................................................... 370/328
See application file for complete search history.

(56) References Cited

U.S. PATENT DOCUMENTS

| | | | |
|---|---|---|---|
| 10,028,128 B2 | 7/2018 | Salkintzis | |
| 10,142,994 B2 | 11/2018 | Lee et al. | |
| 10,362,511 B2 | 7/2019 | Youn et al. | |
| 10,397,892 B2 | 8/2019 | Vrzic et al. | |
| 10,524,166 B2 | 12/2019 | Youn et al. | |
| 2018/0199240 A1 | 7/2018 | Dao et al. | |
| 2018/0376446 A1 | 12/2018 | Youn et al. | |
| 2019/0007500 A1* | 1/2019 | Kim | H04L 67/141 |
| 2019/0150219 A1 | 5/2019 | Wang et al. | |
| 2019/0254083 A1* | 8/2019 | Stammers | H04W 48/18 |
| 2019/0274181 A1* | 9/2019 | Zhu | H04W 36/32 |
| 2019/0364541 A1 | 11/2019 | Ryu | |
| 2020/0252785 A1* | 8/2020 | Wu | H04W 28/06 |
| 2020/0336937 A1* | 10/2020 | Youn | H04W 76/18 |
| 2021/0136719 A1* | 5/2021 | Kim | H04W 60/04 |
| 2022/0007444 A1* | 1/2022 | Kawasaki | H04W 76/34 |

\* cited by examiner

*Primary Examiner* — Mark G. Pannell

(57) ABSTRACT

A wireless communication network serves a wireless User Equipment (UE) over multiple Data Network Names (DNNs). The wireless communication network comprises network circuitry and a Radio Access Network (RAN). The network circuitry executes a Unified Data Management (UDM), a Session Management Function (SMF), and an Access and Mobility Management Function (AMF). The UDM detects a DNN reattach condition for the wireless UE and transfers a DNN reattach message for the UE to the SMF. The SMF receives the DNN reattach message and responsively transfers the DNN reattach message to the AMF. The AMF receives the DNN reattach message for the wireless UE and responsively transfers an N2 Packet Data Unit (PDU) session reattach message for the wireless UE to the RAN. The AMF receives an N2 PDU session request from the RAN for the wireless UE and responsively selects a new SMF for the PDU session.

20 Claims, 9 Drawing Sheets

WIRELESS COMMUNICATION SERVICE DELIVERY USING MULTIPLE DATA NETWORK NAMES (DNNS)

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless access nodes are connected to the wireless network cores over backhaul data links.

The wireless access nodes comprise Radio Units (RUs), Distributed Units (DUs) and Centralized Units (CUs). The RUs are mounted at elevation and have antennas, modulators, signal processor, and the like. The RUs are connected to the DUs which are usually nearby network computers. The DUs handle lower wireless network layers like the Physical Layer (PHY) and Media Access Control (MAC). The DUs are connected to the CUs which are larger computer centers that are closer to the network cores. The CUs handle higher wireless network layers like the Radio Resource Control (RRC) and Packet Data Convergence Protocol (PDCP). The CUs are coupled to network functions in the network cores. Exemplary network functions include Access and Mobility Management Functions (AMFs), Session Management Functions (SMFs), and User Plane Functions (UPFs).

A wireless user device attaches to a wireless network core over a wireless access node reports device capabilities like frequency, slice, and Data Network Name (DNN). The wireless network core authorizes the DNNs and uses the authorized DNNs to select network functions to serve the wireless user device. The DNNs may be correlated with network slices, user policies, and external networks. Unfortunately, some DNNs become corrupted through associations with the wrong network slices, user policies, and external networks. When the DNNs are corrupt, the wireless user device may not be able to properly use its wireless communications services. Moreover, the wireless user devices and networks waste significant resources overcoming issues caused by the corrupt DNNs.

TECHNICAL OVERVIEW

A wireless communication network is configured to serve a wireless User Equipment (UE) over multiple Data Network Names (DNNs). The wireless communication network comprises network circuitry and a Radio Access Network (RAN). The network circuitry executes a Unified Data Management (UDM), a Session Management Function (SMF), and an Access and Mobility Management Function (AMF). The UDM detects a DNN reattach condition for one of the DNNs for the wireless UE. The UDM responsively transfers a DNN reattach message for the one DNN and the UE to the SMF. The SMF receives the DNN reattach message for the one DNN and the wireless UE. The SMF responsively transfers the DNN reattach message for the one DNN and the wireless UE to the AMF. The AMF receives the DNN reattach message for the one DNN and the wireless UE. The AMF responsively transfers an N2 Packet Data Unit (PDU) session reattach message for the one DNN and the wireless UE to the RAN that serves the wireless UE. The AMF receives an N2 PDU session request from the RAN for the one DNN and the wireless UE and responsively selects new SMF data for the PDU session and without SMF data modification for the other DNNs.

DETAILED DESCRIPTION

Figure 1:
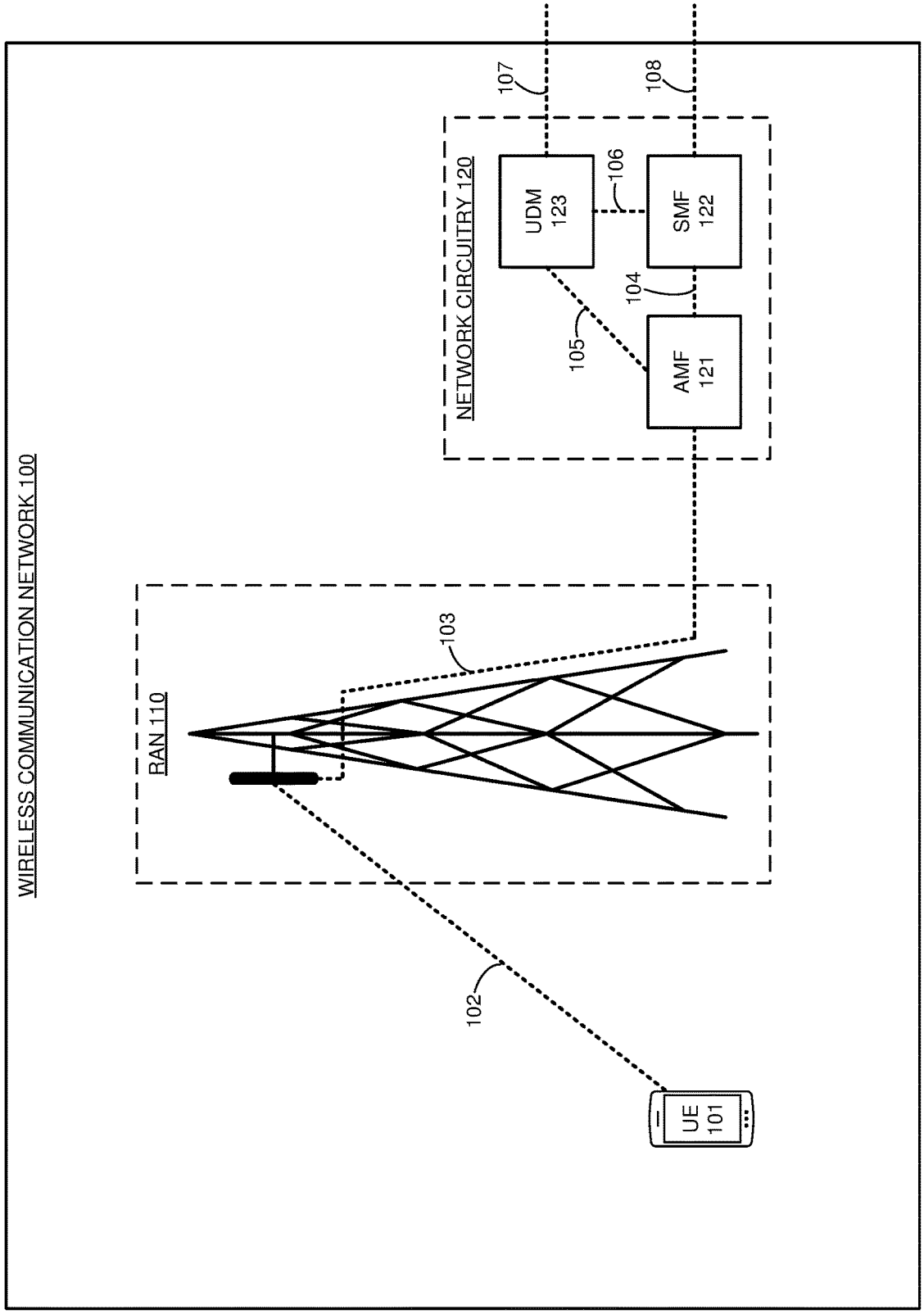
FIG. 1 illustrates a wireless communication network that serves a wireless User Equipment (UE) over multiple Data Network Names (DNNs).

FIG. 1 illustrates wireless communication network 100 to serve wireless User Equipment (UE) 101 over multiple Data Network Names (DNNs). Wireless communication network 100 provides wireless data services to UE 101 like voice/video conferencing, social networking, online gaming, internet access, and/or some other type of wireless networking product. Wireless communication network 100 comprises wireless UE 101, links 102-108, Radio Access Network 110, and network circuitry 120. Network circuitry 120 comprises Access and Mobility Management Function (AMF) 121, Session Management Function (SMF) 122 and Unified Data Management (UDM) 123.

Various examples of network operation and configuration are described herein. In some examples, wireless UE 101 receives wireless communication services from network circuitry 120 over RAN 110 based on multiple DNNs. UDM 123 detects a DNN reattach condition for one of the DNNs for wireless UE 101. For example, UDM 123 may receive a DNN modification request from network circuitry 120 to update DNN data for the DNN. In response the DNN reattach condition, UDM 123 transfers a DNN reattach message for the DNN and wireless UE 101 to SMF 122. SMF 122 transfers the DNN reattach message for the DNN and wireless UE 101 to AMF 121. AMF 121 transfers an N2 Packet Data Unit (PDU) session reattach message for the DNN and wireless UE 101 to RAN 110. RAN 110 and UE 101 perform a PDU session reattach for the DNN, and in response, AMF 121 receives an N2 PDU session request from RAN 110 for the DNN and wireless UE 101. AMF 121 selects new SMF data for the PDU session without modifying SMF data for other DNNs.

Advantageously, network circuitry 120 effectively corrects corrupt DNN data so wireless UE 101 may properly use its wireless communications services. Moreover, wireless communication network 100 efficiently overcomes issues caused by corrupt DNNs and optimizes DNN associations with network slices, user policies, and external networks.

UE 101 and RAN 110 wirelessly communicate over wireless links using Radio Access Technologies (RATs) like Fifth Generation New Radio (5GNR), Long Term Evolution (LTE), Institute of Electrical and Electronic Engineers (IEEE) 802.11 (WIFI), Low-Power Wide Area Network (LP-WAN), and/or some other wireless protocol. The RATs use electromagnetic frequencies in the low-band, mid-band, high-band, or some other portion of the electromagnetic spectrum. RAN 110 and network circuitry 120 communicate over backhaul links that use metallic links, glass fibers, radio channels, or some other communication media. The backhaul links use IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UE 101 comprises a phone, vehicle, sensor, robot, computer, or some other data appliance with wireless communication circuitry. RAN 110 is depicted as a tower but RAN 110 may use another mounting structure or no mounting structure at all. RAN 110 may comprise Fifth Generation Radio Access Networks (5G RANs), LTE RANs, gNodeBs, eNodeBs, NB-IoT access nodes, LP-WAN base stations, wireless relays, and/or some other wireless network transceivers. UE 101 and RAN 110 comprise antennas, amplifiers, filters, modulation, analog/digital interfaces, and microprocessors. UE 101, RAN 110, and network circuitry 120 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein. Network circuitry 120 utilizes a Network Function Virtualization Infrastructure (NFVI) to host AMF 121, SMF 122, and UDM 123. Network Circuity 120 may host other network functions and network elements like User Plane Functions (UPFs), Unified Data Repositories (UDRs), Gateways (GWs), and the like.

Figure 2:
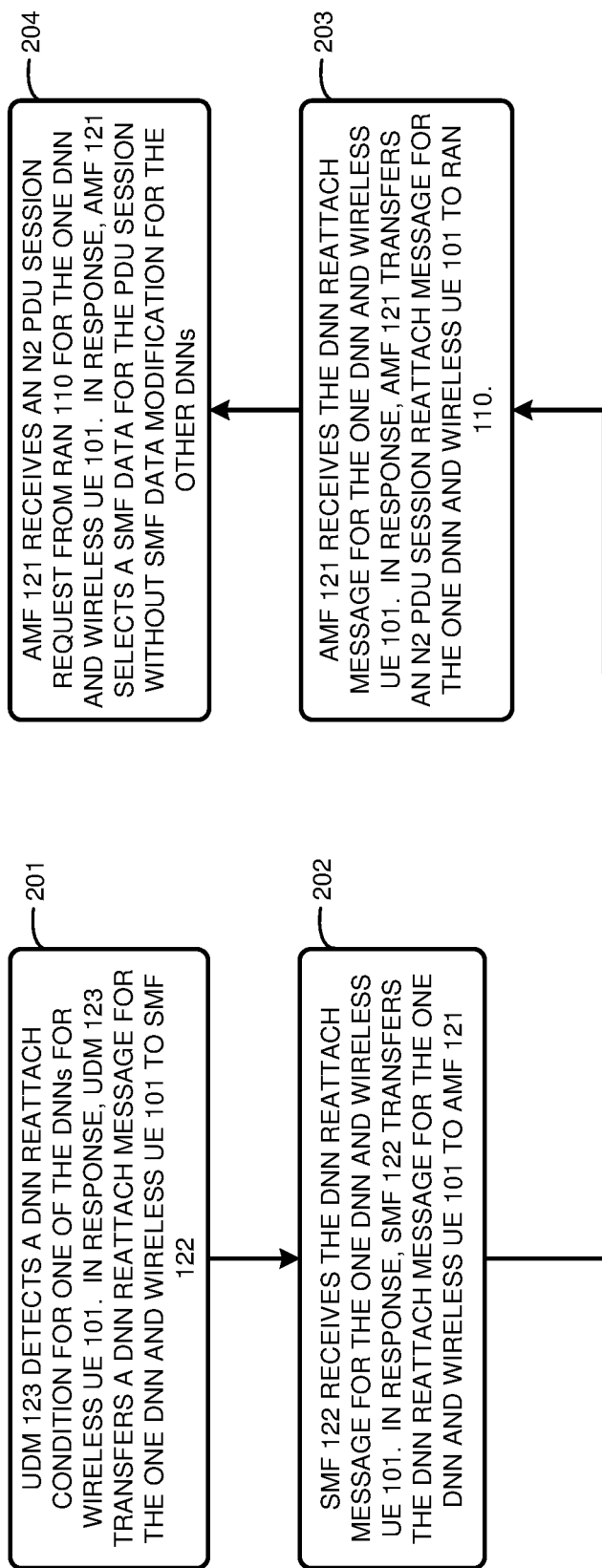
FIG. 2 illustrates the operation of the wireless communication network to serve the wireless UE over the multiple DNNs.

FIG. 2 illustrates the operation of wireless communication network 100 to serve wireless UE 101 over multiple DNNs. The operation is exemplary and may vary in other examples. UDM 123 detects a DNN reattach condition for one of the DNNs for wireless UE 101 (201). In response, UDM 123 transfers a DNN reattach message for the DNN and wireless UE 101 to SMF 122 (201). SMF 122 receives the DNN reattach message for the DNN and wireless UE 101 (202). In response, SMF 122 transfers the DNN reattach message for the DNN and wireless UE 101 to AMF 121 (202). AMF 121 receives the DNN reattach message for the one DNN and wireless UE 101 (203). In response, AMF 121 transfers an N2 PDU session reattach message for the one DNN and wireless UE 101 to RAN 110 (203). AMF 121 receives an N2 PDU session request from RAN 110 for the DNN and wireless UE 101 (204). In response, AMF 121 selects new SMF data for the PDU session without modifying SMF data for other DNNs (204).

Figure 3:
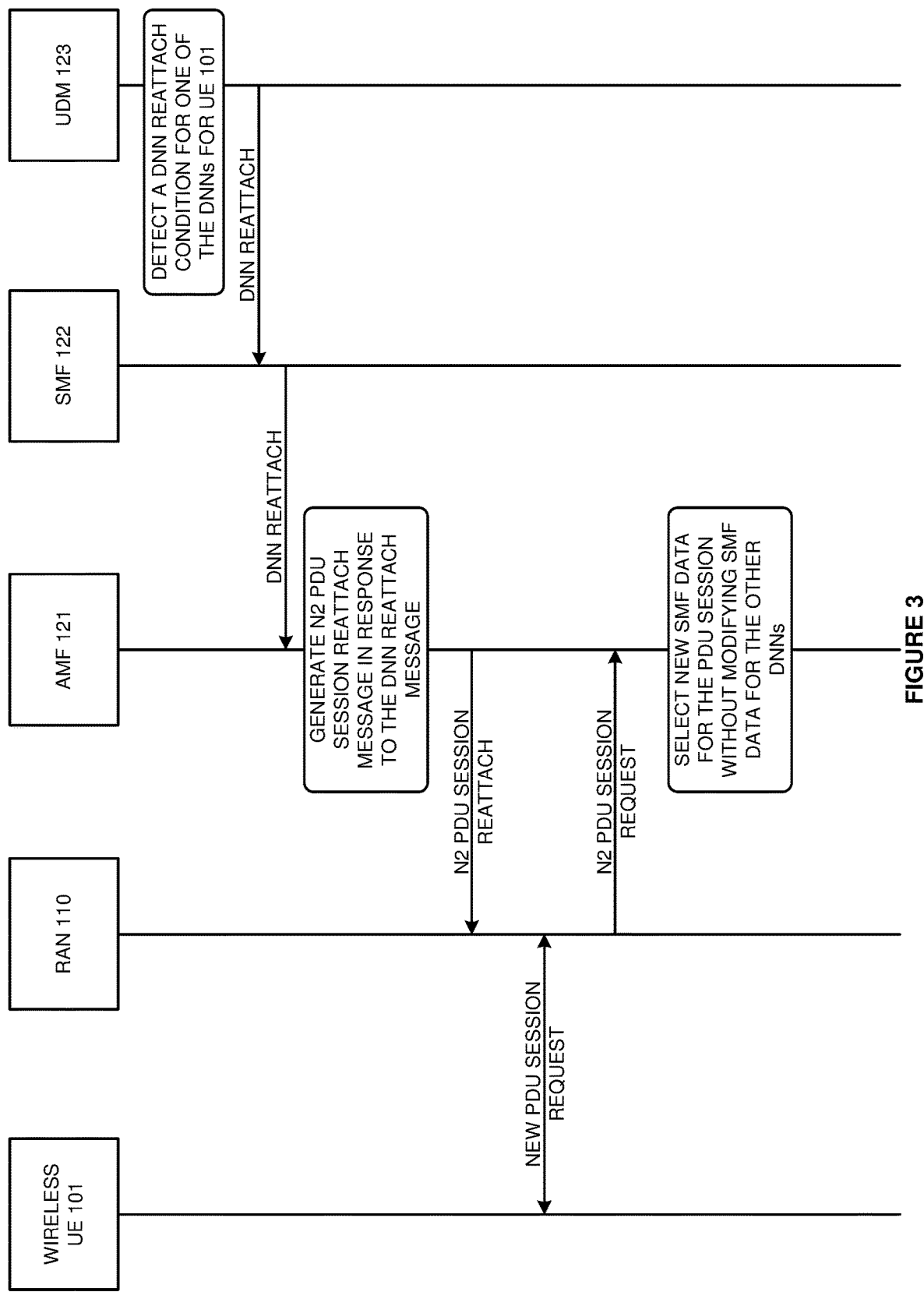
FIG. 3 illustrates the operation of the wireless communication network to serve the wireless UE over the multiple DNNs.

FIG. 3 illustrates the operation of wireless communication network 100 to serve wireless UE 101 over multiple DNNs. The operation is exemplary and may vary in other examples. UDM 123 detects a DNN reattach condition for one of the DNNs for UE 101. The DNN reattach condition may comprise PDU session type modification, uplink/downlink data rate modification, network slice modification, or some other type of data modification for the DNN. For example, UDM 123 may receive a request to change the network slice for the DNN and responsively detect the DNN reattach condition. In response to the DNN reattach condition, UDM 123 transfers a DNN reattach request to SMF 122.

SMF 122 receives the DNN reattach request for the DNN and wireless UE 101 and responsively transfers the DNN reattach request to AMF 121. AMF 121 receives the DNN reattach request from SMF 122. AMF 121 generates a N2 PDU session reattach message for the DNN and UE 101. The N2 PDU session reattach request directs UE 101 to reestablish a PDU session for the DNN over RAN 110. AMF 121 transfers the N2 PDU session reattach request to RAN 110. RAN 110 wirelessly exchanges user signaling with UE 101 to establish a new PDU session for the one DNN. RAN 110 transfers an N2 PDU session request for the DNN and wireless UE 101 to AMF 121. AMF 121 receives the N2 PDU session request from RAN 110. AMF 121 selects new SMF data for the PDU session for the DNN and wireless UE 101 without modifying SMF data for other DNNs. In some examples, AMF 121 selects other types of new data for the PDU session for the DNN and wireless UE 101. For example, the DNN reattach condition may indicate an updated data rate for the DNN and AMF 121 may responsively implement the updated data rate in the new PDU session for the DNN and wireless UE 101.

Figure 4:
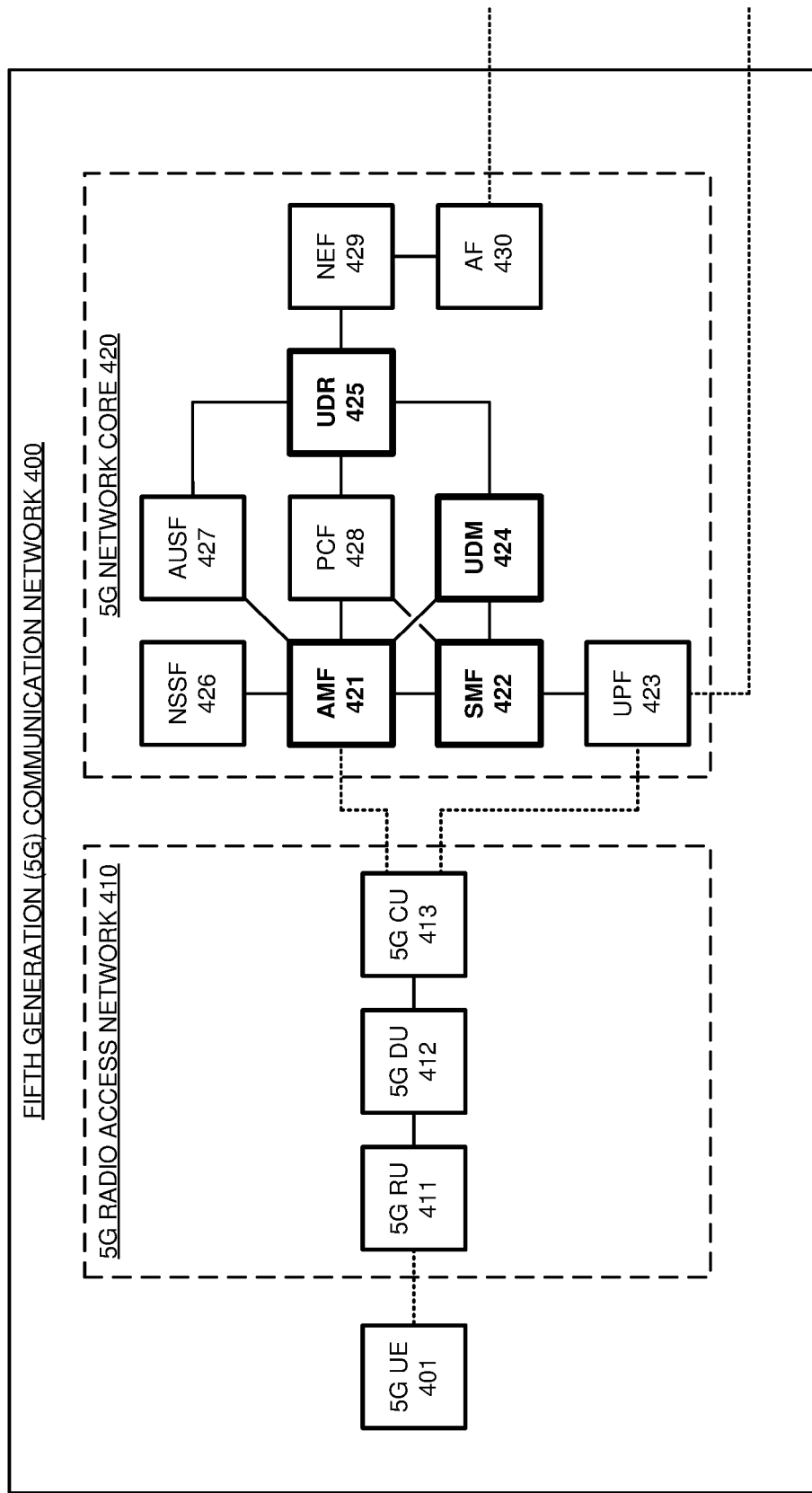
FIG. 4 illustrates a Fifth Generation (5G) communication network that serves a 5G User Equipment (UE) over multiple Data Network Names (DNNs).

FIG. 4 illustrates Fifth Generation (5G) communication network 400 that serves 5G UE 401 over multiple Data Network Names (DNNs). 5G communication network 400 comprises an example of wireless communication network 100, although network 100 may differ. 5G communication network 400 comprises 5G UE 401, 5G Radio Access Network (RAN) 410, and 5G network core 420. 5G/LTE RAN 410 comprises 5G Radio Unit (RU) 411, 5G Distributed Unit (DU) 412, and 5G Centralized Unit (CU) 413. 5G network core 420 comprises Access and Mobility Management Function (AMF) 421, Session Management Function (SMF) 422, User Plane Function (UPF) 423, Unified Data Management (UDM) 424, Unified Data Repository (UDR) 425, Network Slice Selection Function (NSSF) 426, Authentication Server Function (AUSF) 427, Policy Control Function (PCF) 428, Network Exposure Function (NEF) 429, and Application Function (AF) 430. Other network functions are typically present in network core 420 but are omitted for clarity.

UE 401 wirelessly attaches to RU 411 and transfers a registration request to CU 413 over RU 411 and DU 412. The registration request indicates UE capabilities for multiple DNNs. The DNNs specify SMF and UPF selection parameters, external data network addresses, and service policies for Packet Data Unit (PDU) sessions established by UE 401. CU 413 transfers the registration request for UE 401 to AMF 421. AMF 421 interacts with AUSF 427, PCF 428, UDM 424, and typically other network functions to authenticate and authorize UE 401 for wireless data services. Responsive to the authentication and authorization, AMF 421 interacts UDM 424 and typically other network functions to generate UE context for UE 401. The UE context comprises Quality-of-Service (QoS) metrics, slice identifiers (IDs), network addresses, and/or other types of networking data for 5G UE 401. AMF 421 transfers the UE context to CU 413. CU 413 transfers the UE context to UE 401 over DU 412 and RU 411. CU 413 controls DU 412 and RU 411 to serve UE 401. UE 401 uses the DNNs to establish PDU sessions with 5G network core 420 over RAN 410. UE 401 exchanges user signaling for the PDU sessions with AMF 421 and SMF 422. UE 401 exchanges user data for the PDU sessions with UPF 423 over RAN 410.

AF 430 receives a request from a network operator to modify DNN data for one of the DNNs of UE 401. AF 430 transfers the DNN modification request to NEF 429. NEF routes the DNN modification request to UDR 425. The DNN modification request may request DNN replacement, PDU session data rate modification, PDU session type modification, Service Session Continuity (SSC) mode modification, network fallback technology modification, and/or some other type of DNN data modification. For example, a network operator may determine that UE 401 is using an incorrect slice type for one of the DNNs and may send a DNN modification request to AF 430 to modify the slice type for the DNN.

UDR 425 receives the DNN modification request from AF 430 and indicates a DNN reattach requirement for the DNN and UE 401 to UDM 424. In response to the DNN reattach requirement, UDM 424 updates UE subscription information for the DNN. For example, UDM 424 may update the uplink and downlink data rate in the UE subscription information for the DNN. UDM 424 generates a DNN reattach requirement message for the DNN and UE 401. The DNN reattach requirement specifies the DNN indicated by the DNN modification request for UE 401 to reattach over and excludes other DNNs not indicated by the DNN modification request. UDM 424 transfers the DNN reattach requirement to SMF 422. SMF 422 acknowledges the DNN reattach requirement to UDM 424. SMF 422 reconfigures the current PDU session for the DNN and UE 401 for DNN reattachment. SMF 422 transfers the DNN reattach requirement message to AMF 421. AMF 421 acknowledges the DNN reattach requirement to SMF 422. AMF 421 generates an N2 PDU delete session request for the DNN and UE 401. The N2 PDU delete session request directs UE 401 to end the PDU session over the DNN and reestablish a new PDU session over the same DNN without detaching from the network and without ending other PDU sessions over other DNNs. In some examples, the N2 PDU delete session request may specify another DNN for UE to use when establishing the new PDU session instead of the current DNN.

AMF 421 transfers the N2 PDU delete session request to CU 413. CU 413 exchanges user signaling with UE 401 over DU 412 and RU 411 to end the PDU session over the DNN. CU 413 transfers PDU delete session acceptance to AMF 421. UE 401 ends the current PDU session over the DNN without terminating its Radio Resource Control (RRC) connection with CU 413 and its AMF connection with AMF 421 and without ending its PDU sessions for other DNNs. UE 401 transfers a PDU create session request for the DNN to CU 413 over RU 411 and DU 412. CU 413 transfers an N2 PDU create session request for the DNN and UE 401 to AMF 421. AMF 421 receives the N2 PDU create session request and initiates PDU session setup for the DNN and UE 401.

AMF 421 interacts with UDM 424 to retrieve the updated UE subscription information for the DNN and UE 401. The updated UE subscription information indicates an updated data rate, updated PDU session type, updated SSC mode, updated network fallback availability, or some other type of updated DNN data indicated by the DNN modification request. AMF 421 interacts with NSSF 426 to select a network slice for the DNN and UE 401 based on the updated UE subscription information. AMF 421 interacts with PCF 428 to select UE policies for the DNN and UE 401 based on the updated UE subscription information. AMF 421 selects SMF 422 to establish the new PDU session for the DNN and UE 401 based on the updated UE subscription information, the slice, and the UE policies for the DNN and UE 401. In some examples, AMF 421 selects a different SMF based on the updated UE subscription data for the DNN and UE 401. AMF 421 transfers a PDU create session request to SMF 422 to create a PDU session for the DNN and UE 401.

SMF 422 receives the PDU create session request from AMF 421. SMF 422 retrieves the updated UE subscription information for the one DNN and UE 401 from UDM 424. SMF 422 selects UPF 423 based on the updated UE subscription information, the slice ID, and UE policies for the DNN and UE 401. SMF 422 exchanges N4 signaling with UPF 423 to establish the new PDU session for the DNN and UE 401. SMF 422 indicates a PDU session ID and/or other session information for the new PDU session to AMF 421. AMF 421 generates session context for UE to begin the new PDU session. The session context indicates the updated UE subscription information for the DNN and the PDU session ID. AMF 421 transfers the UE context to UE 401 in N1 signaling over RAN 410. UE 401 receives the session context and begins the new PDU session for the DNN. UE 401 exchanges user signaling for the new PDU session with AMF 421 and SMF 422 and exchanges user data for the new PDU session with UPF 423.

Figure 5:
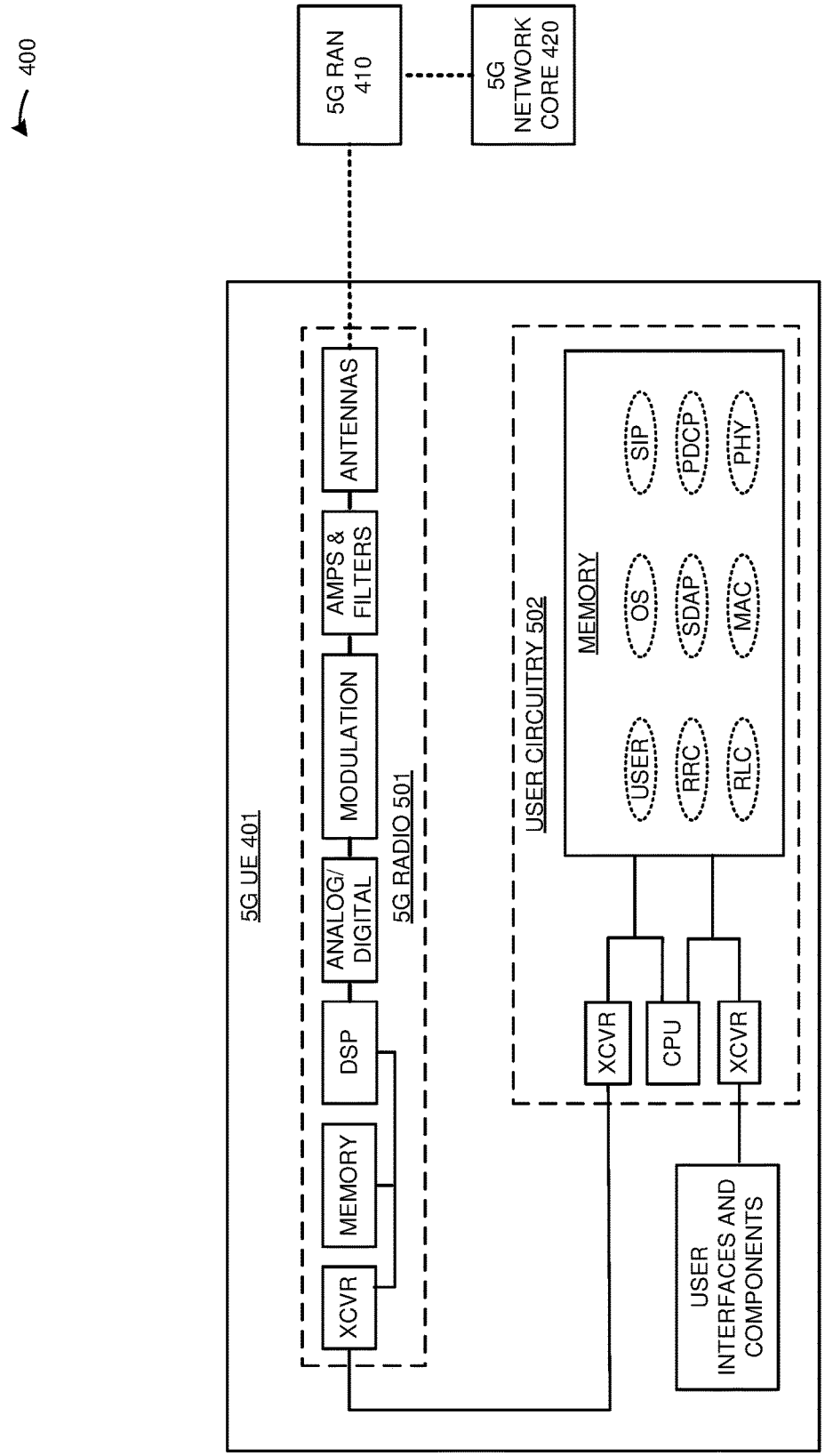
FIG. 5 illustrates the 5G UE that is served over the multiple DNNs by the 5G communication network.

FIG. 5 illustrates 5G UE 401 that is served over the multiple DNNs by 5G communication network 400. UE 401 comprises an example of UE 101, although UE 101 may differ. UE 401 comprises 5G radio 501 and user circuitry 502. Radio 501 comprises antennas, amplifiers, filters, modulation, analog-to-digital interfaces, Digital Signal Processers (DSP), memory, and transceivers that are coupled over bus circuitry. User circuitry 502 comprises memory, CPU, user interfaces and components, and transceivers that are coupled over bus circuitry. The memory in user circuitry 502 stores an operating system, user applications (USER), and 5GNR network applications for Physical Layer (PHY), Media Access Control (MAC), Radio Link Control (RLC), Packet Data Convergence Protocol (PDCP), Service Data Adaptation Protocol (SDAP), and Radio Resource Control (RRC). The antenna in radio 501 is wirelessly coupled to 5G RAN 510 over a 5GNR link. A transceiver in radio 501 is coupled to a transceiver in user circuitry 502. A transceiver in user circuitry 502 is typically coupled to the user interfaces and components like displays, controllers, and memory. The CPU in user circuitry 502 executes the operating system, PHY, MAC, RLC, PDCP, SDAP, and RRC to exchange 5GNR signaling and data with 5G RAN 410 over radio 501.

In radio 501, the antennas receive wireless signals from 5G RAN 410 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 502 over the transceivers. In user circuitry 502, the CPU executes the network applications to process the 5GNR symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data. In radio 501, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 410 that transport the uplink 5GNR signaling and data.

RRC functions comprise authentication, security, handover control, status reporting, QoS, network broadcasts and pages, and network selection. SDAP functions comprise (Quality-of-Service) QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

Figure 6:
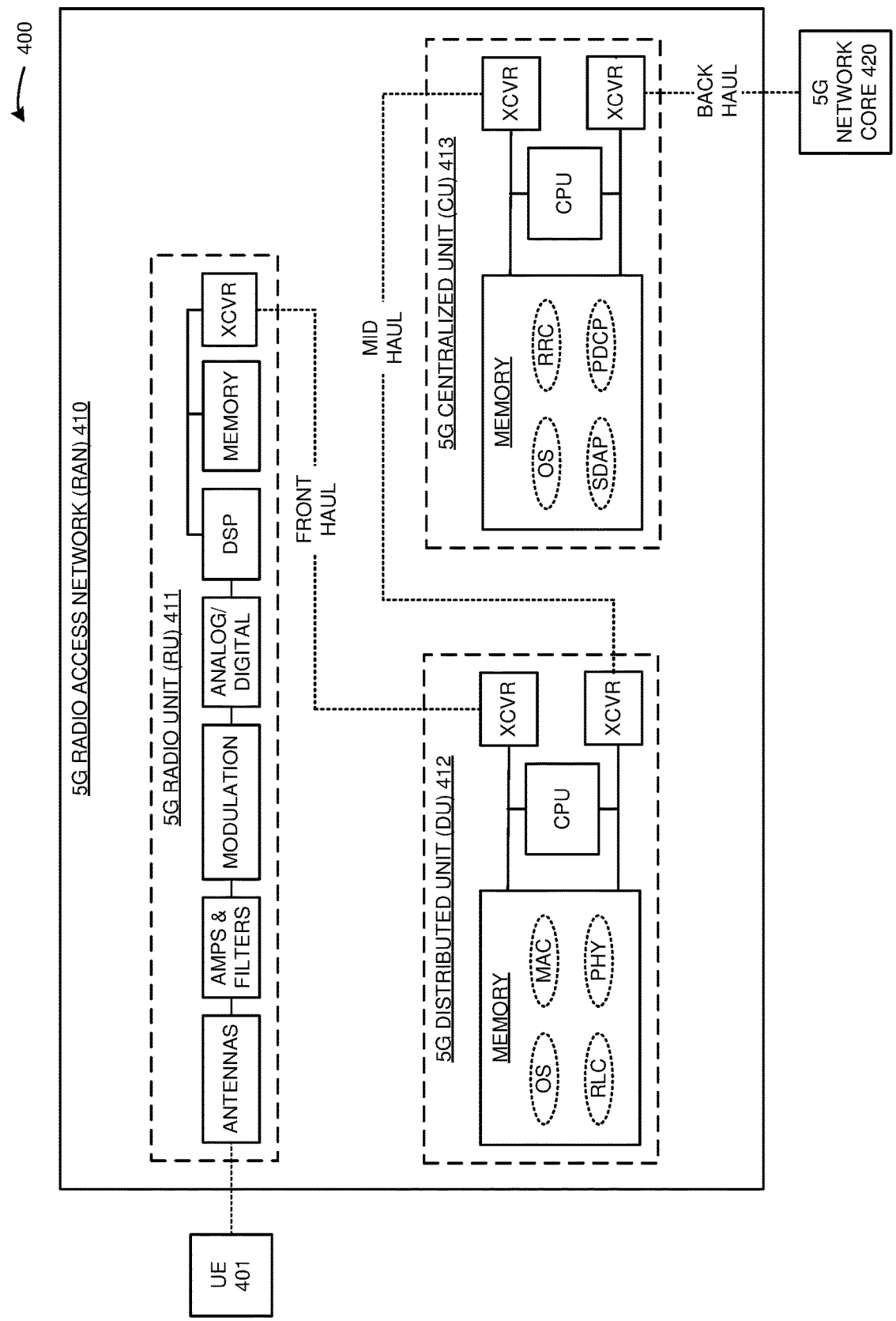
FIG. 6 illustrates a 5G Radio Unit (RU), a 5G Distributed Unit (DU), and a 5G Centralized Unit (CU) that serve the 5G UE over the multiple DNNs.

FIG. 6 illustrates 5G RU 411, 5G DU 412, and 5G CU 413 that serves 5G UE 401 over multiple DNNs. RU 411, DU 412, and CU 413 comprise an example of RAN 110, although RAN 110 may differ. RU 411 comprises antennas, amplifiers, filters, modulation, analog-to-digital interfaces, DSP, memory, and transceivers (XCVRs) that are coupled over bus circuitry. UE 401 is wirelessly coupled to the antennas in RU 411 over a 5GNR link. Transceivers in 5G RU 411 are coupled to transceivers in 5G DU 412 over fronthaul links like enhanced Common Public Radio Interface (eCPRI). The DSP in RU 411 executes its operating system and radio applications to exchange 5GNR signals with UE 401 and to exchange 5GNR data units with DU 412. For the uplink, the antennas receive wireless signals from UE 401 that transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies. The analog/digital interfaces convert the demodulated analog signals into digital signals for the DSP. The DSP transfers corresponding 5GNR symbols to DU 412 over the transceivers.

For the downlink, the DSP receives downlink 5GNR symbols from DU 412. The DSP processes the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5G UE 401 that transport the downlink 5GNR signaling and data.

DU 412 comprises memory, CPU, and transceivers that are coupled over bus circuitry. The memory in 5G DU 412 stores operating systems and 5GNR network applications like PHY, MAC, and RLC. CU 413 comprises memory, CPU, and transceivers that are coupled over bus circuitry. The memory in CU 413 stores an operating system and 5GNR network applications like PDCP, SDAP, and RRC. A transceiver in 5G DU 412 is coupled to a transceiver in RU 411 over front-haul links. A transceiver in DU 412 is coupled to transceivers in CU 413 over mid-haul links. A transceiver in CU 413 is coupled to network core 420 over backhaul links.

RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs. PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

Figure 7:
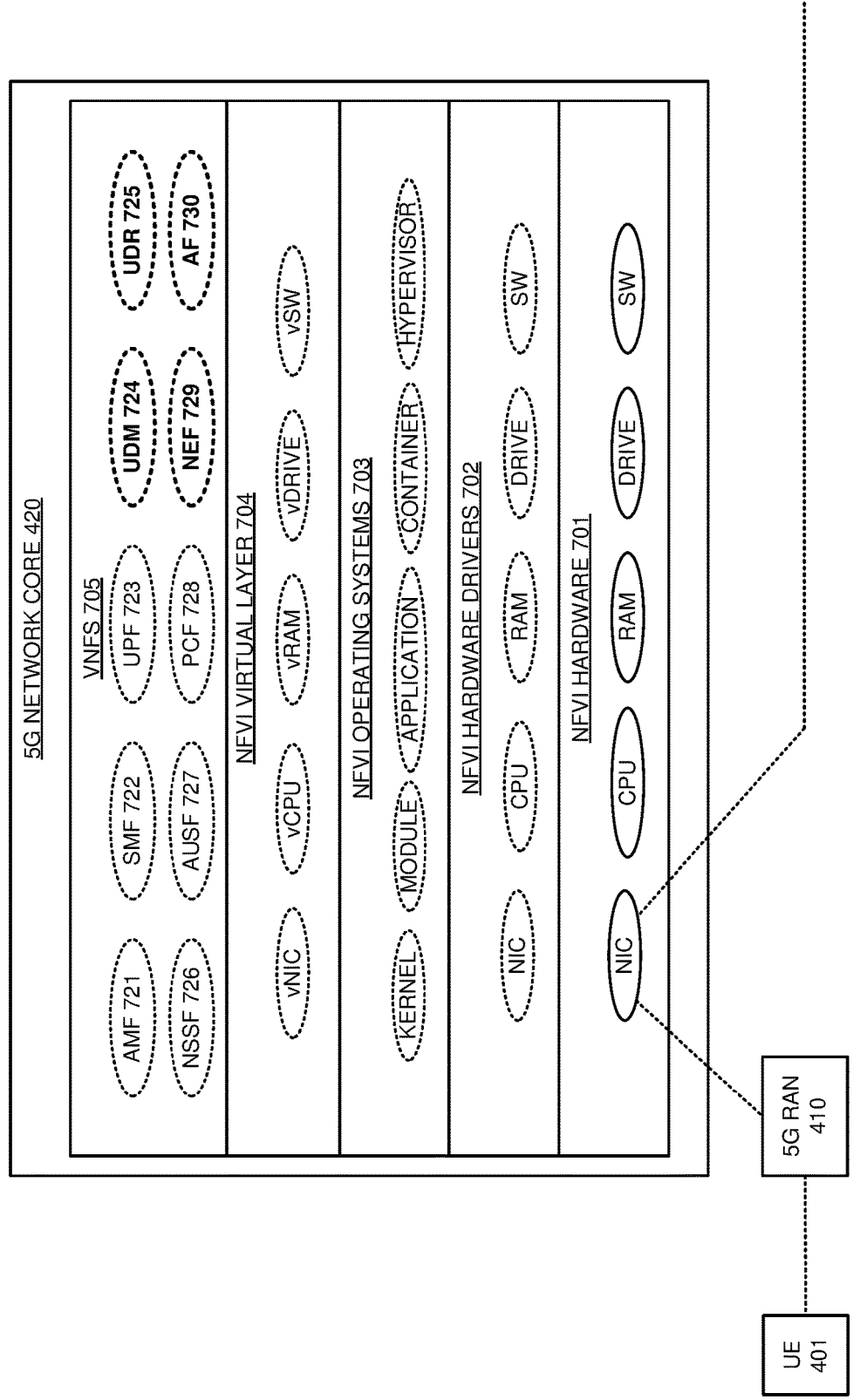
FIG. 7 illustrates a 5G wireless network core that serves the 5G UE over the multiple DNNs.

FIG. 7 illustrates 5G wireless network core 420 that serve 5G UE 401 over multiple DNNs. Wireless network core 420 comprises an example of network circuitry 120, although network circuitry 120 may differ. Wireless network core 420 comprises NFVI hardware 701, NFVI hardware drivers 702, NFVI operating systems 703, NFVI virtual layer 704, and NFVI Virtual Network Functions (VNFs) 705. NFVI hardware 701 comprises Network Interface Cards (NICs), CPU, RAM, Flash/Disk Drives (DRIVE), and Data Switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises vNIC, vCPU, vRAM, vDRIVE, and vSW. NFVI VNFs 705 comprise AMF 721, SMF 722, UPF 723, UDM 724, UDR 725, NSSF 726, AUSF 727, PCF 728, NEF 729, and AF 730. Other VNFs like Network Repository Function (NRF) are typically present but are omitted for clarity. Wireless network core 420 may be located at a single site or distributed across multiple geographic locations. The NIC is coupled to 5G RAN 410 and to external systems. To serve UE 401 over 5G RAN 410, NFVI hardware 701 executes NFVI hardware drivers 702, NFVI operating systems 703, NFVI virtual layer 704, and NFVI VNFs 705 to form AMF 421, SMF 422, UPF 423, UDM 424, UDR 425, NSSF 426, AUSF 427, PCF 428, NEF 429, and AF 430.

Figure 8:
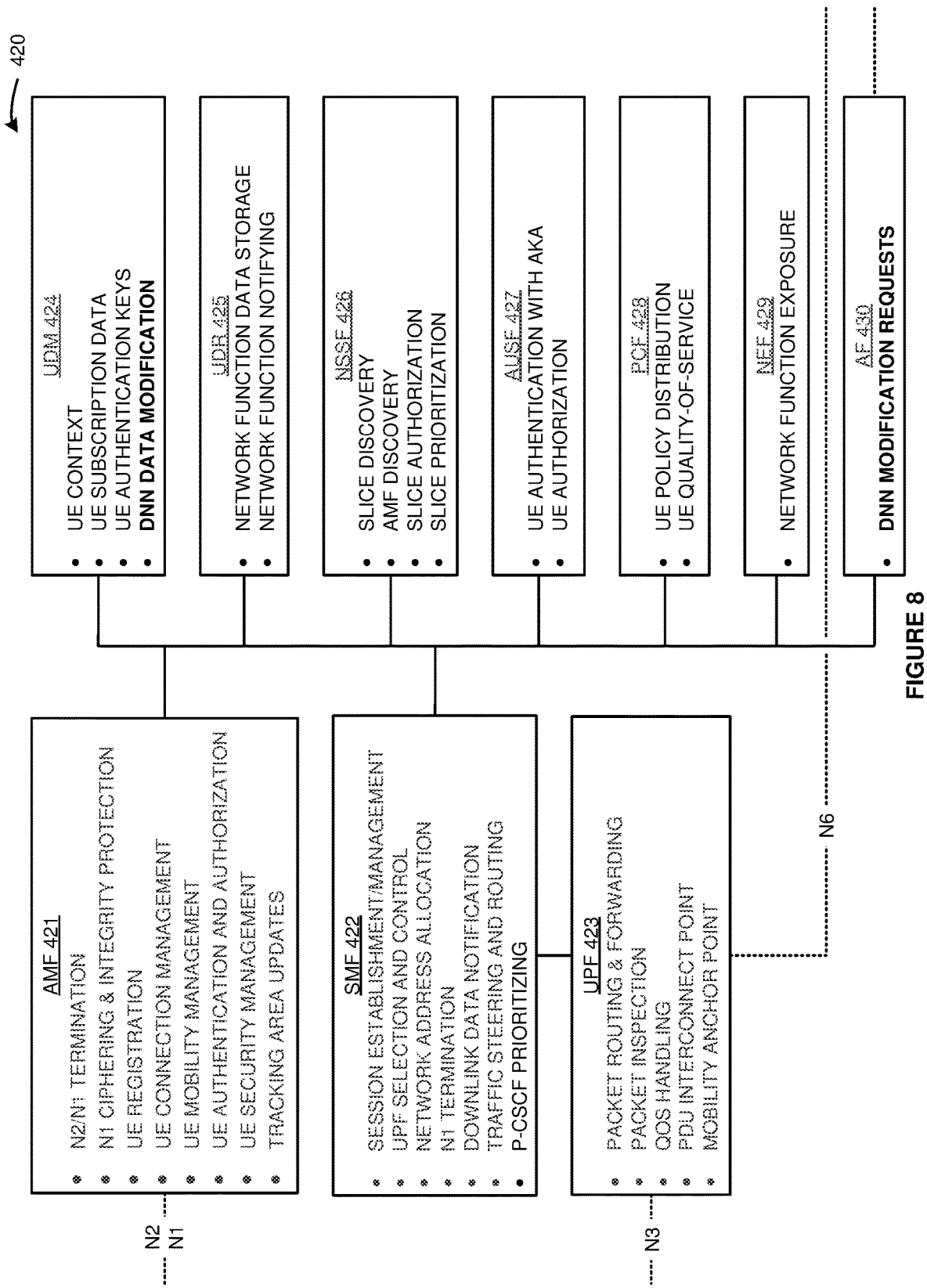
FIG. 8 illustrates the 5G wireless network core that serves the 5G UE over the multiple DNNs.

FIG. 8 further illustrates 5G wireless network core 420 that serves 5G UE 401 over multiple DNNs. AMF 421 performs N2/N1 termination, N1 ciphering & integrity protection, UE registration, SMF/PCF selection, UE connection/mobility management, UE authentication and authorization, UE security management, and tracking area updates. SMF 422 performs session establishment/management, network address allocation, N1 termination, downlink data notification, traffic steering and routing, and P-CSCF prioritizing. UPF 423 performs packet routing & forwarding, packet inspection, QoS handling, PDU interconnection, and mobility anchoring. UDM 424 handles UE context, UE subscription data, UE authentication keys and performs DNN data modification. UDR 425 handles network function data storage and network function notifications. NSSF 426 performs slice discovery, AMF discovery, slice authorization, and slice prioritization. AUSF 427 performs UE authentication with Authentication and Key Agreement (AKA) credentials and handles UE authorizations. PCF 428 distributes UE policies to the control plane, and controls UE Quality-of-Service (QoS). NEF 429 performs network function exposure. AF 430 handles DNN modification requests. Although not shown for clarity, A Network Repository Function (NRF) performs network function authentication and authorization, selection, security, and event registration/subscriptions.

AMF 421 receives a registration request for UE 401 from RAN 410. The registration request indicates UE capabilities for multiple DNNs. In response to the registration request, AMF 421 interacts with AUSF 427, PCF 428 and UDM 424 to authenticate and authorize UE 401 for wireless data services. Responsive to the authentication and authorization, AMF 421 interacts UDM 424 to generate UE context for UE 401. The UE context comprises Quality-of-Service (QoS) metrics, slice identifiers, network addresses, and other service information for 5G UE 401. AMF 421 transfers the UE context to UE 401 over RAN 410. UE 401 establishes PDU sessions with 5G network core 420 over RAN 410 based on the DNNs. AMF 421 and SMF 422 exchange user signaling for the PDU sessions with UE 401 over RAN 410. UPF 423 exchanges user data for the PDU sessions with UE 401 over RAN 410.

AF 430 receives a DNN modification request from a network operator to modify DNN data for one of the DNNs of UE 401. AF 430 transfers the DNN modification request to NEF 429. NEF 429 routes the DNN modification request to UDR 425. The DNN modification request requires data rate modification, PDU session type modification, and network slice reselection for one of the DNNs used UE 401. In some examples, the DNN modification request may require modification of a different set of DNN data for one of the DNNs used by UE 401. In some examples, the DNN modification request may require DNN replacement of one of the DNNs used by UE 401.

UDR 425 receives the DNN modification request from AF 430. UDR 425 indicates a DNN reattach requirement for the DNN to UDM 424. UDM 424 updates UE subscription information to modify the data rate, PDU session type, and network slice ID for the DNN. UDM 424 generates a DNN reattach requirement message for the DNN and UE 401. UDM 424 transfers the DNN reattach requirement to SMF 422. SMF 422 prepares the current PDU session for DNN reattachment and transfers the DNN reattach requirement message to AMF 421. AMF 421 transfers an N2 PDU delete session request to UE 401 over RAN 410. The N2 PDU delete session request directs UE 401 to end the current PDU session for the DNN and establish a new PDU session for the same DNN. UE 401 accepts the PDU delete session for the DNN and RAN 410 transfers a N2 PDU delete session acceptance message for UE 401 to AMF 421. UE 401 ends the current PDU session over the DNN and maintains its RRC with CU 413 and its AMF connection with AMF 421. UE 401 transfers a PDU create session request for the DNN to AMF 421 over RAN 410. AMF 421 receives the N2 PDU create session request and initiates setup of the new PDU session for the one DNN and UE 401.

AMF 421 retrieves the updated UE subscription information for the one DNN and UE 401 from UDM 424. AMF 421 interacts with NSSF 426 to select a new network slice for the one DNN and UE 401 based on the updated UE subscription information. AMF 421 interacts with PCF 428 to select UE policies for the one DNN and UE 401 based on the updated UE subscription information for the one DNN and UE 401. AMF 421 selects SMF 422 to establish the new PDU session for the one DNN and UE 401 based on the updated UE subscription information, the selected slice ID, and the UE policies for the one DNN and UE 401. AMF 421 transfers a PDU create session request to SMF 422 to create a PDU session for the one DNN and UE 401.

SMF 422 receives the PDU create session request from AMF 421. SMF 422 retrieves the updated UE subscription information from UDM 424. SMF 422 selects UPF 423 based on the updated data rate, PDU session type, and slice ID for the one DNN. SMF 422 exchanges N4 signaling with UPF 423 to establish the new PDU session for the one DNN and UE 401. SMF 422 indicates UPF 423 and the PDU session ID for the one DNN to AMF 421. AMF 421 generates UE context that indicates the updated UE subscription information and the PDU session ID for the one DNN. AMF 421 transfers the UE context to UE 401 over RAN 410. UE 401 receives the UE context initiates the new PDU session with the one DNN based on the UE context.

Figure 9:
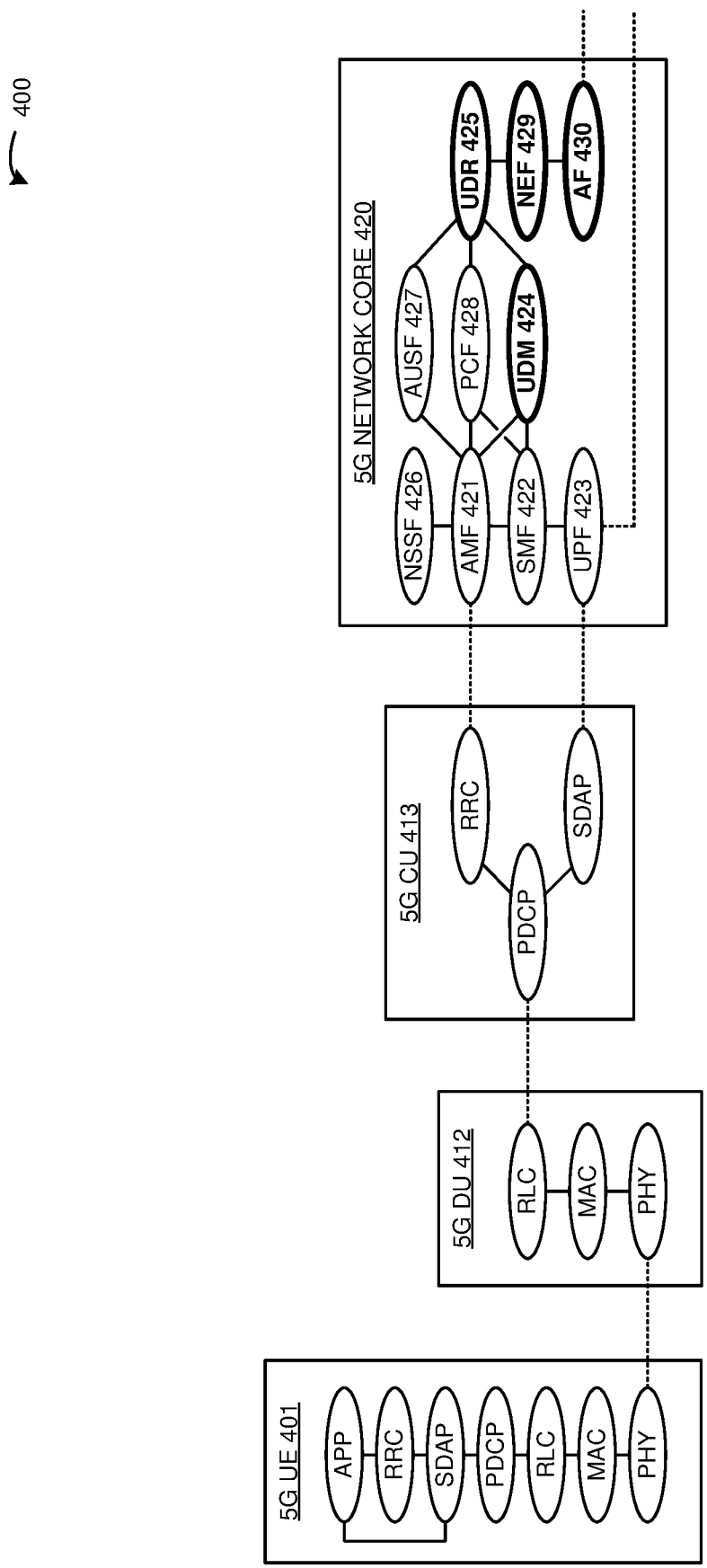
FIG. 9 illustrates the operation of the 5G communication network to serve the 5G UE over the multiple DNNs.

FIG. 9 illustrates the operation of 5G communication network 400 to serve 5G UE 401 over multiple DNNs. The operation is exemplary and may vary in other examples. The RRC in UE 401 wirelessly attaches to the RRC in CU 413 over the PDCPs, RLCs, MACs, and PHYs. The RRC in UE 401 transfers a registration request to the RRC in CU 413. The registration request indicates UE capabilities for multiple DNNs. The RRC in CU 413 transfers a registration request to AMF 421 for UE 401 to register with the network. AMF 421 interacts with AUSF 427, PCF 428, and UDM 424 to authenticate and authorize UE 401 for wireless data services. Responsive to the authentication and authorization, AMF 421 interacts UDM 424 to generate UE context for UE 401. The UE context comprises Quality-of-Service (QoS) metrics, slice identifiers, and network addresses for UE 401. AMF 421 transfers the UE context for UE 401 to the RRC in CU 413. The RRC in CU 413 transfers the UE context to the RRC in UE 401 over the PDCPs, RLCs, MACs, and PHYs. The RRC in CU 413 controls the SDAP, PDCP, RLC, MAC, and PHY in RAN 410 to serve UE 401. The RRC in UE 401 uses the DNNs to establish PDU sessions with 5G network core 420 over RAN 410. The RRC in UE 401 exchanges user signaling for the PDU sessions with the RRC in CU 413 over the PDCPs, RLCs, MACs, and PHYs. The SDAP in UE 401 exchanges user data for the PDU sessions with the SDAP in CU 413 over the PDCPs, RLCs, MACs, and PHYs. The RRC in CU 413 exchanges the user signaling for the PDU sessions with AMF 421 and SMF 422. The SDAP in CU 413 exchanges the user data for the PDU sessions with UPF 423.

AF 430 receives a DNN modification request from a network operator to modify the network slice and QoS profile for one of the DNNs assigned UE 401. AF 430 transfers the DNN modification request to UDR 425 over NEF 429. UDR 425 indicates a DNN reattach requirement and the modification request for the one DNN and UE 401 to UDM 424. In response to the DNN modification request, UDM 424 updates UE subscription information to modify the network slice and QoS profile for the one DNN UE 401. UDM 424 generates a DNN reattach requirement message for the one DNN and UE 401 and transfers the DNN reattach requirement to SMF 422. SMF 422 acknowledges the DNN reattach requirement to UDM 424 and reconfigures the current DNN session for DNN reattachment. SMF 422 transfers the DNN reattach requirement message to AMF 421. AMF 421 acknowledges the DNN reattach requirement to SMF 422 and generates an N2 PDU delete session request for the one DNN and UE 401.

AMF 421 transfers the N2 PDU delete session request to the RRC in CU 413. The RRC in CU 413 exchanges user signaling with the RRC in UE 401 over the PDCPs, RLCs, MACs, and PHYs to end the PDU session for the one DNN. The RRC in UE 401 ends the current PDU session over the one DNN and maintains its RRC connection with CU 413 and its AMF connection with AMF 421. The RRC in UE 401 transfers a PDU create session request for the one DNN to the RRC in CU 413 over the PDCPs, RLCs, MACs, and PHYs. The RRC in CU 413 transfers an N2 PDU create session request for the one DNN and UE 401 to AMF 421. AMF 421 receives the N2 PDU create session request and initiates setup of the new PDU session for the one DNN and UE 401.

AMF 421 interacts with UDM 424 to retrieve the updated UE subscription information that indicates new network slice and new QoS profile for the one DNN and UE 401. AMF 421 interacts with NSSF 426 to select the new network slice for the one DNN and UE 401. AMF 421 interacts with PCF 428 to select UE policies for the one DNN and UE 401. AMF 421 selects SMF 422 to establish the new PDU session for the one DNN and UE 401 based on the UE policies from PCF 428 and the updated UE subscription information that indicates the new network slice and QoS profile for the one DNN and UE 401. AMF 421 transfers a PDU create session request to SMF 422 to create a PDU session for the one DNN and UE 401.

SMF 422 receives the PDU create session request from AMF 421. SMF 422 retrieves the updated UE subscription information indicating the new network slice and QoS profile for the one DNN and UE 401 from UDM 424. SMF 422 selects UPF 423 to serve UE 401 based on the updated UE subscription information for the one DNN and UE 401. SMF 422 exchanges N4 signaling with UPF 423 to establish the new PDU session for the one DNN and UE 401. SMF 422 indicates UPF 423 and the PDU session ID for the one DNN and UE 401 to AMF 421. AMF 421 generates UE context that indicates the updated UE subscription information and the PDU session ID for the one DNN. AMF 421 transfers the UE context to the RRC in UE 401 in N1 signaling over RAN 410. The RRC in UE 401 receives the UE context and begins the new PDU session over the one DNN. The new PDU session uses the new network slice and new QoS profile for the one DNN. The RRC in UE 401 exchanges user signaling for the new PDU session with AMF 421 and SMF 422 over RAN 410. The SDAP in UE 401 exchanges user data for the new PDU session with UPF 423 over RAN 410.

The wireless data network circuitry described above comprises computer hardware and software that form special-purpose circuitry to serve a wireless UE over multiple Data Network Names (DNNs). The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose circuitry to serve a wireless UE over multiple DNNs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a wireless User Equipment (UE) over multiple Data Network Names (DNNs), the method comprising:
   UDM circuitry detecting a DNN reattach condition for one of the DNNs for the wireless UE and responsively transferring a DNN reattach message for the one DNN and the wireless UE to SMF circuitry;

the SMF circuitry receiving the DNN reattach message for the one DNN and the wireless UE and responsively transferring the DNN reattach message for the one DNN and the wireless UE to AMF circuitry;

the AMF circuitry receiving the DNN reattach message for the one DNN and the wireless UE and responsively transferring an N2 Packet Data Unit (PDU) session reattach message for the one DNN and the wireless UE to a Radio Access Network (RAN) that serves the wireless UE; and the AMF circuitry receiving an N2 PDU session request from the RAN for the one DNN and the wireless UE and responsively selecting a new SMF data for the PDU session and without SMF data modification for the other DNNs.

2. The method of claim 1 wherein the UDM circuitry detecting the DNN reattach condition and transferring the DNN reattach message comprises a Unified Data Repository (UDR) circuitry determining to modify the one DNN to a new DNN and indicating the new DNN to the UDM circuitry.

3. The method of claim 1 wherein the UDM circuitry detecting the DNN reattach condition and transferring the DNN reattach message comprises a Unified Data Repository (UDR) circuitry determining to modify a data rate for the one DNN and the wireless UE and indicating the modified data rate to the SMF circuitry.

4. The method of claim 1 wherein the UDM circuitry detecting the DNN reattach condition and transferring the DNN reattach message comprises a Unified Data Repository (UDR) circuitry determining to modify Packet Data Unit (PDU) session type for the one DNN and the wireless UE and indicating the modified PDU session type to the SMF circuitry.

5. The method of claim 1 wherein the UDM circuitry detecting the DNN reattach condition and transferring the DNN reattach message comprises a Unified Data Repository (UDR) circuitry determining to modify Service Session Continuity (SSC) mode for the one DNN and the wireless UE and indicating the modified SSC mode to the SMF circuitry.

6. The method of claim 1 wherein the UDM circuitry detecting the DNN reattach condition and transferring the DNN reattach message comprises a Unified Data Repository (UDR) circuitry determining to modify a network fallback technology for the one DNN and the wireless UE and indicating the network fallback technology to the SMF circuitry.

7. The method of claim 1 further comprising the AMF circuitry selecting a new Unified Data Management (UDM) data for the PDU session and without UDM data modification for the other DNNs.

8. The method of claim 1 further comprising the AMF circuitry selecting a new Policy Control Function (PCF) data for the PDU session and without PCF data modification for the other DNNs.

9. The method of claim 1 further comprising the AMF circuitry selecting a new Network Slice Selection Function (NSSF) data for the PDU session and without NSSF data modification for the other DNNs.

10. The method of claim 1 further comprising:

the RAN receiving the DNN reattach message for the one DNN and the wireless UE and transferring the N2 Packet Data Unit (PDU) session reattach message for the one DNN and the wireless UE to the AMF circuitry without performing a Radio Resource Control (RRC) reattachment for the wireless UE; and wherein:

the AMF circuitry receiving the DNN reattach message, transferring the N2 PDU session reattach message, receiving the N2 PDU session request, and selecting the new SMF data for the PDU session for the one DNN and the wireless UE comprises receiving the DNN reattach message, transferring the N2 PDU session reattach message, receiving the N2 PDU session request, and selecting the new SMF data for the PDU session for the one DNN and the wireless UE without performing AMF reattachment for the one DNN and the wireless UE.

11. A wireless communication network configured to serve a wireless User Equipment (UE) over multiple Data Network Names (DNNs), the wireless communication network comprising:

UDM circuitry configured to detect a DNN reattach condition for one of the DNNs for the wireless UE and responsively transfer a DNN reattach message for the one DNN and the wireless UE to SMF circuitry;

the SMF circuitry configured to receive the DNN reattach message for the one DNN and the wireless UE and responsively transfer the DNN reattach message for the one DNN and the wireless UE to AMF circuitry;

the AMF circuitry configured to receive the DNN reattach message for the one DNN and the wireless UE and responsively transfer an N2 Packet Data Unit (PDU) session reattach message for the one DNN and the wireless UE to a Radio Access Network (RAN) that serves the wireless UE; and the AMF configure to receive an N2 PDU session request from the RAN for the one DNN and the wireless UE and responsively select a new SMF data for the PDU session and without SMF data modification for the other DNNs.

12. The wireless communication network claim 11 wherein the UDM circuitry comprises a Unified Data Repository (UDR) circuitry configured to determine to modify the one DNN to a new DNN and indicate the new DNN to the UDM circuitry.

13. The wireless communication network claim 11 wherein the UDM circuitry comprises a Unified Data Repository (UDR) circuitry configured to determine to modify a data rate for the one DNN and the wireless UE and indicate the modified data rate to the SMF circuitry.

14. The wireless communication network claim 11 wherein the UDM circuitry comprises a Unified Data Repository (UDR) circuitry configured to determine to modify Packet Data Unit (PDU) session type for the one DNN and the wireless UE and indicate the modified PDU session type to the SMF circuitry.

15. The wireless communication network claim 11 wherein the UDM circuitry comprises a Unified Data Repository (UDR) circuitry configured to determine to modify Service Session Continuity (SSC) mode for the one DNN and the wireless UE and indicate the modified SSC mode to the SMF circuitry.

16. The wireless communication network claim 11 wherein the UDM circuitry comprises a Unified Data Repository (UDR) circuitry configured to determine to modify a network fallback technology for the one DNN and the wireless UE and indicate the network fallback technology to the SMF circuitry.

17. The wireless communication network claim 11 further comprising the AMF circuitry configured to select a new Unified Data Management (UDM) data for the PDU session and without UDM data modification for the other DNNs.

18. The wireless communication network claim 11 further comprising the AMF circuitry configured to select a new Policy Control Function (PCF) data for the PDU session and without PCF data modification for the other DNNs.

19. The wireless communication network claim 11 further comprising the AMF circuitry configured to select a new Network Slice Selection Function (NSSF) data for the PDU session and without NSSF data modification for the other DNNs.

20. The wireless communication network claim 11 further comprising:
- the RAN configured to receive the DNN reattach message for the one DNN and the wireless UE and transfer the N2 Packet Data Unit (PDU) session reattach message for the one DNN and the wireless UE to the AMF circuitry without performing a Radio Resource Control (RRC) reattachment for the wireless UE; and wherein:
- the AMF is configured to receive the DNN reattach message, transfer the N2 PDU session reattach message, receive the N2 PDU session request, and select the new SMF data for the PDU session for the one DNN and the wireless UE without performing AMF reattachment for the one DNN and the wireless UE.

* * * * *